United States Patent
Tsirkin (10) Patent No.: US 10,019,325 B2
(45) Date of Patent: *Jul. 10, 2018

(54) VIRTUAL DEVICE BACKEND RECOVERY

(71) Applicant: Red Hat Israel, Ltd., Raanana (IL)

(72) Inventor: Michael Tsirkin, Raanana (IL)

(73) Assignee: Red Hat Israel, LTD., Raanana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,891

(22) Filed: Nov. 28, 2016

(65) Prior Publication Data

US 2017/0075770 A1    Mar. 16, 2017

Related U.S. Application Data

(63) Continuation of application No. 14/803,510, filed on Jul. 20, 2015, now Pat. No. 9,507,626.

(51) Int. Cl.
*G06F 9/455* (2006.01)
*G06F 11/14* (2006.01)

(52) U.S. Cl.
CPC ...... *G06F 11/1464* (2013.01); *G06F 9/45558* (2013.01); *G06F 2009/4557* (2013.01); *G06F 2009/45595* (2013.01); *G06F 2201/815* (2013.01)

(58) Field of Classification Search
CPC .................................................. G06F 9/45533
USPC ............................................................. 718/1
See application file for complete search history.

(56) References Cited

U.S. PATENT DOCUMENTS

| | | | | |
|---|---|---|---|---|
| 7,853,960 B1* | 12/2010 | Agesen | ................. | G06F 9/4825 718/1 |
| 7,868,738 B2* | 1/2011 | Dasgupta | .............. | G06F 9/4443 340/10.32 |
| 8,924,964 B2* | 12/2014 | Kodi | .................... | G06F 9/45558 718/1 |
| 8,970,603 B2* | 3/2015 | Post | ...................... | G06T 15/005 345/501 |
| 9,256,440 B1* | 2/2016 | Cattaneo | ............... | G06F 9/4411 |
| 9,317,440 B2* | 4/2016 | Park | .................... | G06F 12/1009 |
| 9,330,036 B2* | 5/2016 | Tsirkin | .................... | G06F 13/24 |
| 9,378,049 B1* | 6/2016 | Johnson | ................. | G06F 9/467 |
| 2004/0221285 A1* | 11/2004 | Donovan | ................ | G06F 9/485 718/1 |
| 2005/0076324 A1* | 4/2005 | Lowell | ............... | G06F 9/45558 717/100 |

(Continued)

OTHER PUBLICATIONS

Heeseung Jo, et al., "Transparent Fault Tolerance of Device Drivers for Virtual Machines", http://calab.kaist.ac.kr/~hjukim/CS-TR-2009-312.pdf, Jun. 29, 2009, 15 pgs.

(Continued)

*Primary Examiner* — Mehran Kamran
(74) *Attorney, Agent, or Firm* — Haynes & Boone LLP (57) ABSTRACT

Methods, systems, and computer program products for restoring a backend after a backend disconnect. The method includes detecting a disconnect of a backend. The method further includes setting a flag and notifying a guest regarding the disconnect. The method further includes resetting a data structure accessed by the backend. The method further includes detecting (or initiating) or a reconnect of the backend. The method further includes sending the backend a state of the data structure.

20 Claims, 4 Drawing Sheets

(56) References Cited

U.S. PATENT DOCUMENTS

| | | | | |
|---|---|---|---|---|
| 2007/0192765 A1* | 8/2007 | Shimogawa | G06F 9/45537 | 718/1 |
| 2007/0288937 A1* | 12/2007 | Durojaiye | G06F 11/3688 | 719/327 |
| 2008/0184077 A1* | 7/2008 | Kuttan | G06F 11/0745 | 714/48 |
| 2008/0189570 A1* | 8/2008 | Terashima | G06F 11/0712 | 714/2 |
| 2008/0303833 A1* | 12/2008 | Swift | G06T 15/005 | 345/505 |
| 2009/0089815 A1* | 4/2009 | Manczak | G06F 9/4411 | 719/327 |
| 2009/0210888 A1* | 8/2009 | Lee | G06F 9/4812 | 719/321 |
| 2011/0107148 A1* | 5/2011 | Franklin | G06F 11/0712 | 714/37 |
| 2011/0145814 A1* | 6/2011 | Mangione-Smith | G06F 9/5077 | 718/1 |
| 2011/0225453 A1* | 9/2011 | Spry | G06F 11/1092 | 714/15 |
| 2012/0033680 A1* | 2/2012 | Gopinath | H04L 49/901 | 370/412 |
| 2012/0081355 A1* | 4/2012 | Post | G06T 15/005 | 345/419 |
| 2013/0031225 A1* | 1/2013 | Evans | H04L 67/36 | 709/221 |
| 2013/0031568 A1* | 1/2013 | Tamir | G06F 9/468 | 719/318 |
| 2013/0104124 A1* | 4/2013 | Tsirkin | G06F 9/45558 | 718/1 |
| 2013/0132618 A1* | 5/2013 | de Goede | G06F 13/105 | 710/48 |
| 2013/0155083 A1* | 6/2013 | McKenzie | G06T 1/20 | 345/522 |
| 2013/0247056 A1* | 9/2013 | Hattori | G06F 9/5077 | 718/102 |
| 2014/0108584 A1* | 4/2014 | Lu | H04L 47/76 | 709/208 |
| 2014/0372794 A1* | 12/2014 | Graham | G06F 9/5077 | 714/15 |
| 2015/0172169 A1* | 6/2015 | DeCusatis | H04L 45/14 | 718/1 |
| 2016/0041880 A1* | 2/2016 | Mitkar | G06F 11/1412 | 707/680 |
| 2016/0070585 A1* | 3/2016 | Tsirkin | G06F 9/45558 | 718/1 |
| 2016/0124762 A1* | 5/2016 | Tsirkin | G06F 9/45545 | 718/1 |
| 2016/0191673 A1* | 6/2016 | Bohannon | H04L 67/2861 | 709/213 |

OTHER PUBLICATIONS

Hewlett-Packard, "HP Virtual TapeServer for NonStop Servers", http://h10032.www1.hp.com/ctg/Manual/c03250220, Mar. 2012, 77 pgs.

Rusty Russell, "Virtio: Towards a De-Facto Standard for Virtual I/O Devices", http://ozlabs.org/~rusty/virtio-spec/virtio-paper.pdf, Jul. 1, 2008, 9 pgs.

Sanjay Kumar, et al., "Netbus: A Transparent Mechanism for Remote Device Access in Virtualized Systems", http://www.cercs.gatech.edu/tech-reports/tr2007/git-cercs-07-08.pdf, 2007, 14 pgs.

* cited by examiner

VIRTUAL DEVICE BACKEND RECOVERY

PRIORITY INFORMATION

This application is a continuation of U.S. patent application Ser. No. 14/803,510 filed Jul. 20, 2015, issued as U.S. Pat. No. 9,507,626 and entitled "Virtual Device Backend Recovery," the disclosure of which is hereby incorporated by reference in its entirety.

BACKGROUND

The present disclosure relates generally to virtual computing systems, and more particularly to recovery in a virtual environment.

Typical networks include hardware-based network devices. These devices perform functions such as providing network security (e.g., firewalls), reducing network congestion (e.g., load balancers, rate controllers), routing traffic (e.g., routers, switches), and so forth.

More recently, the trend has been to supplement and/or replace hardware-based network devices with software-based "virtual" network devices. Virtual network devices offer many advantages, such as faster deployment.

BRIEF SUMMARY

According to an example, a method for recovery in a virtual environment includes detecting, at a hypervisor, a disconnect of a backend. The method further includes sending a notification to a guest, the notification corresponding to the disconnect. The method further includes resetting a queue, wherein the queue is provided by a virtual device, wherein the queue stores requests corresponding to the backend. The method further includes detecting or initiating, at the hypervisor, a reconnect of the backend. The method further includes sending, to the backend, a state corresponding to the queue.

According to an example, a computer program product includes machine readable instructions that when executed by a processor cause the processor to: identify, at a hypervisor, a disconnect of a backend. The instructions further cause the processor to set a flag in a memory space of a virtual device. The instructions further cause the processor to send a notification to a guest, the notification corresponding to the disconnect. The instructions further cause the processor to reset a data structure that is stored in the memory space of the virtual device, wherein the data structure stores packets that are provided to the backend. The instructions further cause the processor to identify, at the hypervisor, a reconnect of the backend. The instructions further cause the processor to send, to the backend, a state corresponding to the data structure.

According to an example, a network virtualization system includes a processor and a memory. The system further includes a hypervisor stored on the memory. The system further includes a virtual machine presented by the hypervisor. The virtual machine includes a guest and a virtual device. The system further includes a queue that is stored in a memory space of the virtual device, where the queue stores requests corresponding to a backend. The backend accesses requests from the queue. The hypervisor is executed by the processor to: identify a disconnect corresponding to the backend; set a flag and notify the guest regarding the disconnect; initiate a reset of the queue; identify or initiate a reconnect of the backend; and notify the backend of a state corresponding to the queue.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
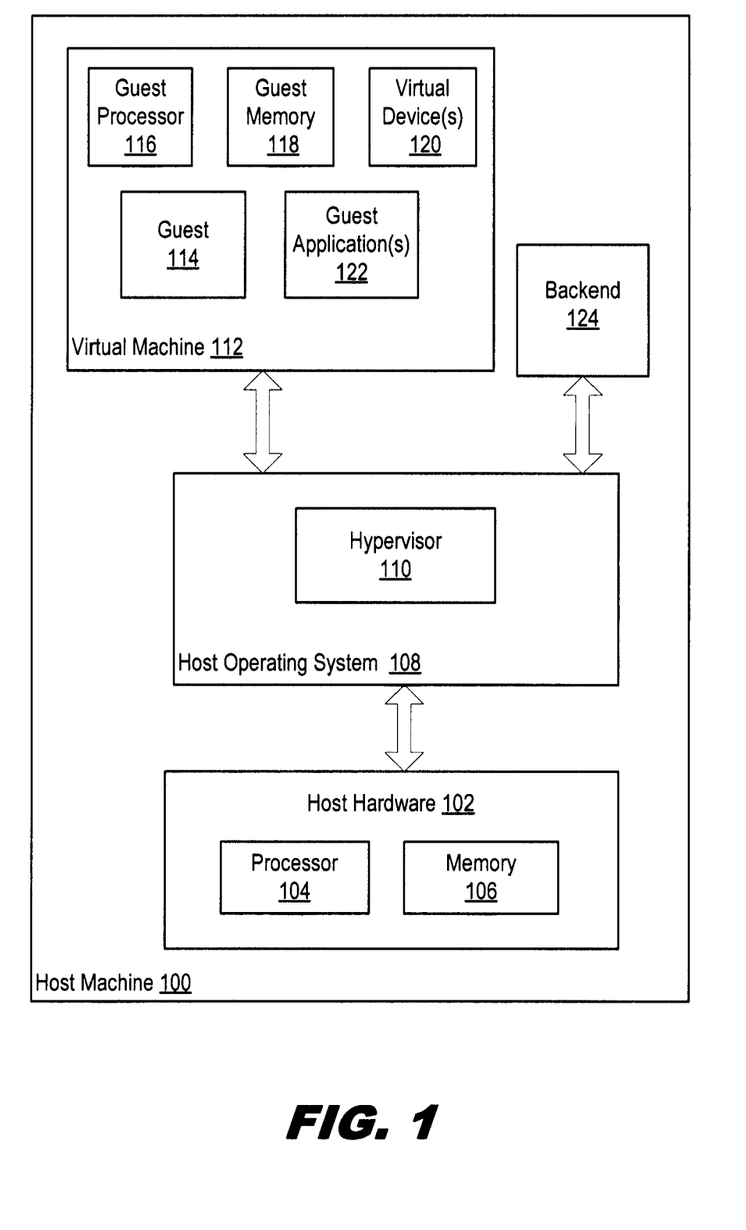
FIG. 1 is a block diagram illustrating an example of a computer system hosting a virtual machine, in accordance with various examples of the present disclosure.

FIG. 1 is a block diagram that illustrates an example of a physical computer system that hosts one or more virtual machines. The physical computer system is referred to herein as a host machine 100.

Host machine 100 includes host hardware 102. Host hardware includes physical elements such as processor 104, memory 106, and other hardware components (e.g., a network interface device, keyboard, display, and so forth). Host machine 100 may include a single machine or multiple host machines arranged in a cluster.

Host machine 100 includes host operating system 108 that installs and executes software programs. Some examples of types of operating systems that may be run include LINUX, UNIX, OS X, WINDOWS, and so forth. Host machine 100 includes hypervisor 110 (e.g., QEMU), which also may be referred to as a virtual machine monitor (VMM). In the present example, hypervisor 110 is a component of host operating system 108. In other examples, hypervisor 110 may run on top of host operating system 108, or may run directly on host hardware 102 without the use of a host operating system.

Hypervisor 110 manages system resources, including access of virtual machines to processor 104, memory 106, and other host hardware devices. In the present example, hypervisor 110 is implemented in software and provides one or more virtual machines, such as virtual machine 112. Virtual machine 112 is an underlying emulation of host machine 100. Virtual machine 112 may be, for example, a hardware emulation, full virtualization, para-virtualization, and operating system-level virtualization virtual machine.

The term virtual machine generally refers to part of a host system that is allocated to and available for use by a guest (e.g., guest 114). Virtual machine 112 includes, for example, virtual CPUs (e.g., guest processor 116), virtual memory (e.g., guest memory 118), one or more virtual devices (e.g., virtual device(s) 120) such as a network device, an emulated NIC or disk, physical devices over which a guest is given partial or full control, virtual firmware such as a Basic Input/Output System (BIOS) and/or an Extensible Firmware Interface (EFI), an Advanced Configuration and Power Interface (ACPI), and so forth. Hypervisor 110 prepares the configuration address space of virtual machine 112 with virtual hardware, such as virtual device(s) 120. Upon initialization, virtual machine 112 probes its configuration address space, assigns IO and address ranges to virtual device(s) 120, and initializes guest 114. Virtual machine 112 exposes virtual device(s) 120 to guest 114, such that guest 114 may access virtual device(s) 120. In some examples, the exposing of virtual device(s) 120 is performed by virtual machine 112 preparing ACPI tables that are queried by guest 114 during a boot process.

The term "guest" refers to computer readable instructions run on hypervisor 110. Guest 114 may include, for example, a copy of firmware in memory, an operating system, and additional installed software (e.g., guest application(s) 122). In one example, guest 114 may run the same or a different operating system as the host operating system 108. One or more guest application(s) 122 run on guest 114. In an example, a guest application may be a process or other type of software application that is executed. A guest application also may refer to a process or application that runs on the guest operating system.

In the present example, at least one of virtual device(s) 120 is a virtual device that performs network operations. The virtual device provides a queue that stores requests, such as packets (e.g., network packets), in entries of the queue. In other examples, a plurality of queues are provided by the virtual device. In yet other examples, the virtual device provides other data structures instead of, or in addition to, the queue(s).

In the present example, the queue is configured in a memory space of the virtual device, and may be referred to as a virtual queue. The memory space includes, for example, memory addresses that are assigned (e.g., by the hypervisor) to the virtual device. In other examples, the queue is stored in guest memory 118.

In the present example, backend 124 (e.g., VHOST-USER BACKEND) is an application and/or driver that handles the queue provided by the virtual device. In some examples, backend 124 provides packet-switching functionality for network function virtualization (NFV). In some examples, backend 124 runs on hypervisor 110. In other examples, backend 124 runs on a virtual machine (e.g., virtual machine 112 or another virtual machine). In yet other examples, backend 124 runs on another host machine. In the present example, backend 124 is a less privileged application that is separate from hypervisor 110. This approach offers the advantage of improved security. However, one downside of separating backend 124 from hypervisor 110 is that the queue state may be lost if backend 124 is disconnected. Accordingly, in the present example, hypervisor 110, guest 114 and virtual device(s) 120 restore the queue state to backend 124 once it reconnects.

The queue operates as a communication channel between guest 114 and backend 124, such that guest 114 and backend 124 communicate without using the hypervisor as an intermediary. In particular, guest 114 and backend 124 access the queue to retrieve requests from the queue and/or place requests into the queue.

Hypervisor 110 is configured with a hypervisor device state that includes a state corresponding to the queue. In the present example, the hypervisor device state identifies one or more addresses corresponding to the queue and provides a validity index corresponding to the queue.

Figure 2:
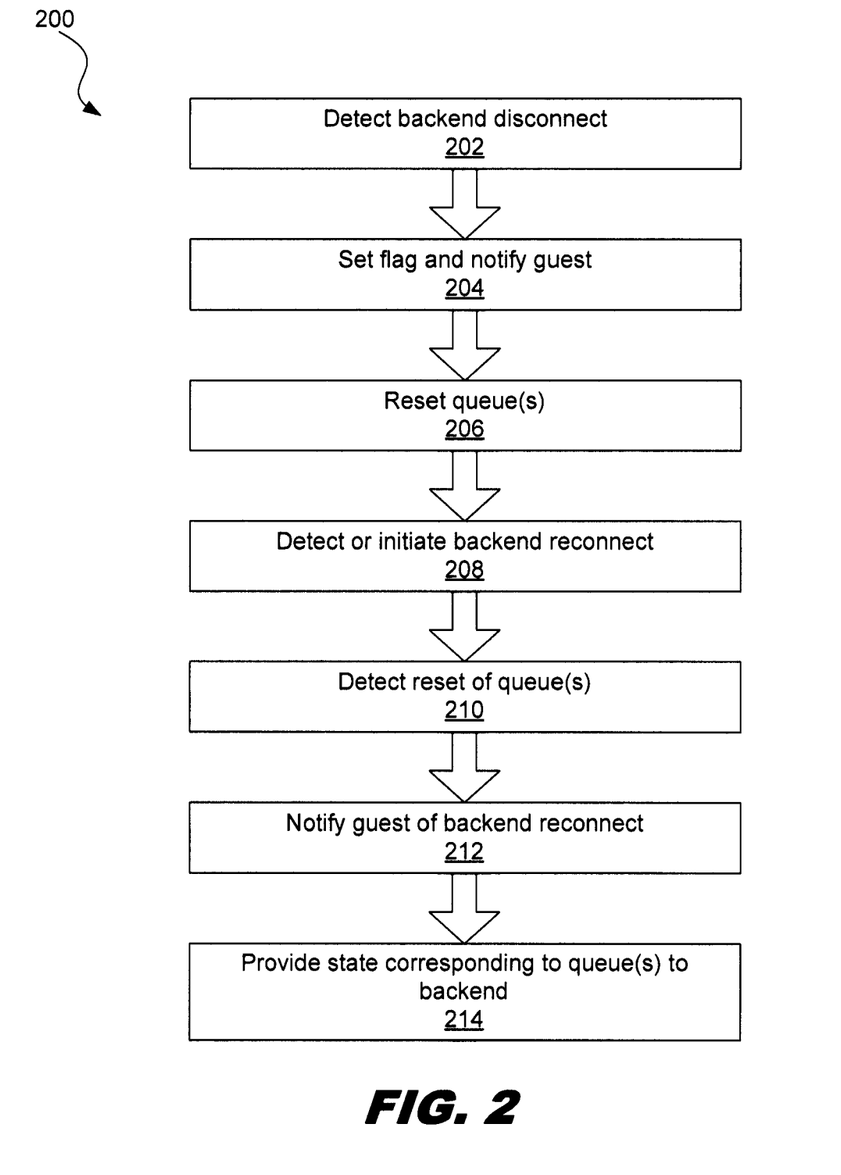
FIG. 2 is a flowchart showing an illustrative recovery of a backend, in accordance with various examples of the present disclosure.

FIG. 2 is a flowchart showing an illustrative recovery of a backend. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At block 202, a hypervisor detects a disconnect of a backend. In some examples, the detecting is performed by the hypervisor registering to watch a process corresponding to the backend, and waiting for the process to exit. In other examples, the hypervisor transmits (e.g., either synchronously or asynchronously) one or more keepalive probes to the backend and identifies a disconnect when one or more of the keepalive probes are not replied to by the backend. A disconnect refers to a crash, exit, or any other fault corresponding to the backend.

At block 204, responsive to the disconnect, the hypervisor sets one or more flags and notifies a guest that is executing on a virtual machine regarding the disconnect of the backend. In the present example, setting a flag refers to modifying one or more data values in (1) a memory space of a virtual device that is configured on the virtual machine and/or (2) the guest's memory. In the present example, the hypervisor sends the notification to the guest by triggering an interrupt that is received by the guest. In some examples, the interrupt is a message signal interrupt.

At block 206, responsive to the notification, the guest identifies one or more queues that correspond to the backend. In the present example, the one or more queues are stored in the memory space of a virtual device. In some examples, the flag and/or notification identifies the one or more queues corresponding to the backend. In the present example, responsive to receiving the notification, the guest checks the flag(s) set by the hypervisor to identify the one or more queues. The identified queues may include all queues corresponding to the backend or a subset of the queues corresponding to the backend. In the present example, once identified, the hypervisor and guest act in concert to reset the identified one or more queues.

In the present example, the portion of the reset performed by the guest includes: (1) the guest requesting/notifying the hypervisor to reset a hypervisor device state corresponding to each queue; and (2) the guest completing each request in each queue. In some examples, completing a request may be performed by the guest discarding the request and notifying the sender of the request that the request was not processed. A request may be discarded from a queue by clearing (e.g., zeroing out) one or more memory addresses of the queue that are occupied by the request. In other examples, completing a request is performed by re-queuing the request. In some examples, the virtual device that provides the queue may be reset in order to reset all queues provided by the virtual device. In other examples, a queue provided by the virtual device is reset without resetting the virtual device.

In the present example, the notification from the guest to the hypervisor identifies the one or more queues. Upon receiving the notification from the guest, the hypervisor performs its part of the reset by resetting a hypervisor device state corresponding to the identified one or more queues. A hypervisor device state corresponding to a queue may, for example, identify one or more addresses corresponding to the queue and provide an index corresponding to the queue. For each queue that the guest has identified, the hypervisor places the queue into a known state, by updating the index corresponding to the queue. In the present example, the hypervisor device state corresponding to each queue is modified by updating the index corresponding to the queue to a pre-configured value (e.g., zero).

In the present example, the resetting of the hypervisor device state (also referred to as a "host state") corresponding to the identified one or more queues is performed prior to the guest resetting the guest state corresponding to the one or more queues (e.g., by completing the requests in each queue). For example, the guest notifies the hypervisor to reset the hypervisor device state prior to completing the requests in the queues. In other examples, the reset performed by the hypervisor and the guest may be performed simultaneously, or by the guest performing the reset prior to the hypervisor performing the reset.

At block 208, in the present example, the hypervisor detects that the backend is reconnected. In another example, the hypervisor requests that the backend be reconnected. Reconnecting the backend refers to, for example, restarting a process corresponding to the backend and/or running the backend. In some examples, the hypervisor detects that the backend is reconnected by monitoring processes to identify/detect whether a process corresponding to the backend is running. In other examples, the hypervisor detects that the backend is reconnected by sending a keepalive probe to the backend and receiving a response from the backend.

At block 210, the hypervisor detects/identifies that the guest has completed the queue reset. In some examples, the detecting is performed by the hypervisor receiving a notification from the guest that informs the hypervisor that the guest has completed the requests in the identified queue(s) (e.g., by clearing or re-queuing the requests) and that the queue(s) are ready for use.

At block 212, responsive to determining that the backend is reconnected, the hypervisor notifies the guest of the backend reconnect.

At block 214, the hypervisor provides the hypervisor device state to the backend. This providing of the hypervisor device state allows the backend to identify that the queue(s) are in the known state, and therefore continue processing requests using the queue(s) provided by the virtual device. Accordingly, the hypervisor has synchronized the state of the queue(s) between the guest and the backend such that the queue communication channel between the guest and the backend is restored.

Figure 3:
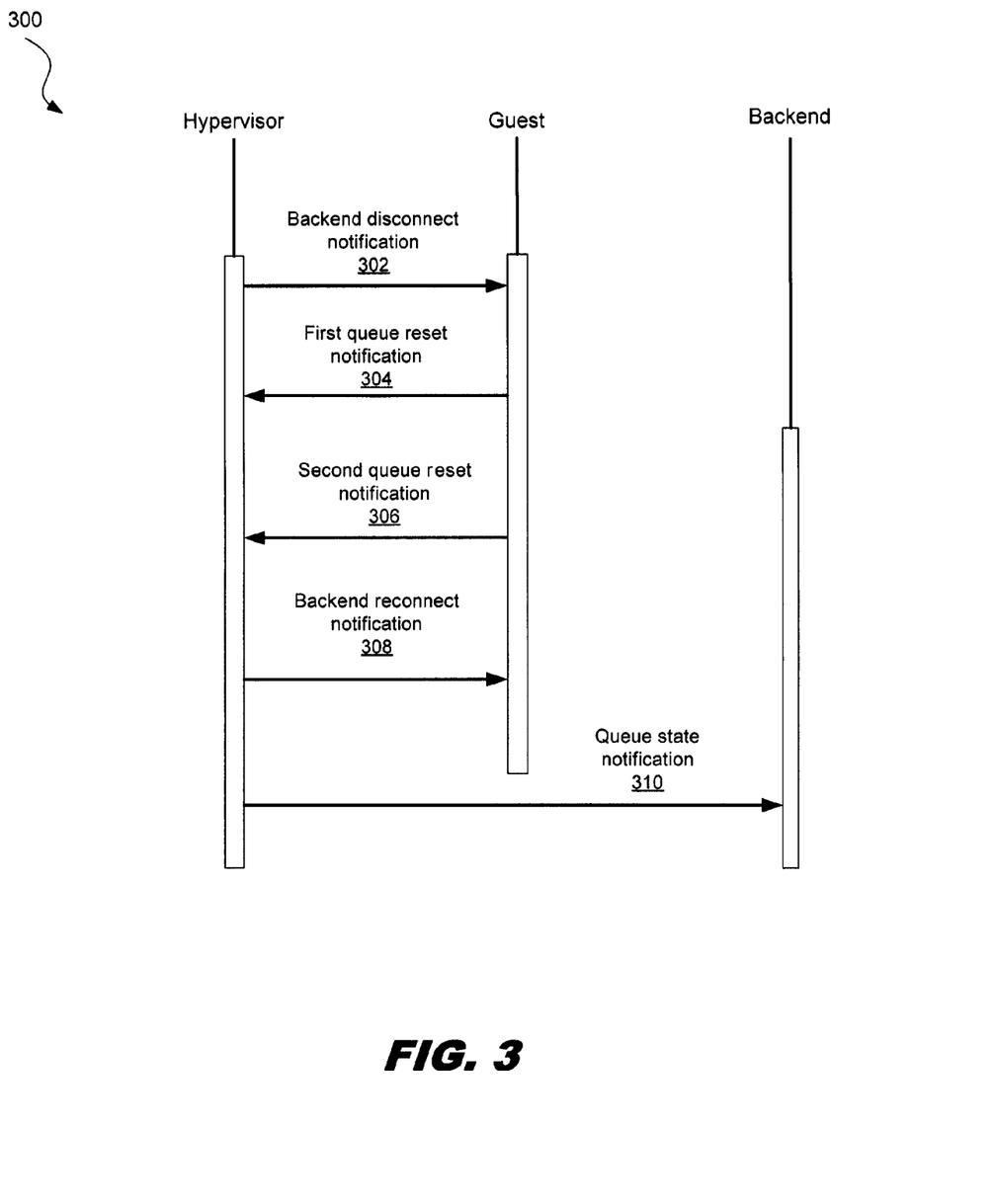
FIG. 3 is a flowchart showing illustrative communications between a hypervisor, a guest, and a backend during a recovery of the backend, in accordance with various examples of the present disclosure.

FIG. 3 is a flowchart showing illustrative communications between a hypervisor, a guest, and a backend during a recovery of the backend. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

In the present example, upon detecting a backend disconnect, the hypervisor communicates a backend disconnect notification 302 to the guest. The hypervisor communicates with the guest, such as by setting flags in virtual devices and/or the guest's memory, and by sending notifications. In some examples, notifications are sent from the hypervisor to the guest via interrupts (e.g., a message signal interrupt).

The guest communicates a first queue reset notification 304 to the hypervisor, the queue reset request corresponding to a queue that is accessed by the backend. The first queue reset notification 304 informs the hypervisor of the identity of the queue that the hypervisor is to update to a known state (using the hypervisor device state). The hypervisor updating the queue to a known state may also be referred to as resetting a host state corresponding to the queue.

The guest resets the queue (e.g., by completing the requests in the queue or re-queuing the requests). Once the guest has finished resetting the queue the guest communicates a second queue reset notification 306 to the hypervisor. The second queue reset notification 306 informs the hypervisor that the queue is ready for use. The guest communicates notifications to the hypervisor, such as via hypercalls, memory-mapped IO (MMIO), shared memory, and so forth.

The hypervisor communicates a backend reconnect notification 308 to the guest, upon determining that the backend is running. The hypervisor communicates with the guest, such as by setting flags in virtual devices and/or the guest's memory, and by sending notifications. In some examples, notifications are sent from the hypervisor to the guest via an interrupt (e.g., a message signal interrupt).

The hypervisor communicates a queue state notification 310 to the backend, to update the backend with the current state of the queue. The hypervisor communicates with the backend, such as by establishing a socket. In some examples, the socket is a UNIX domain socket. In other examples, the socket is a TCP/IP socket.

Figure 4:
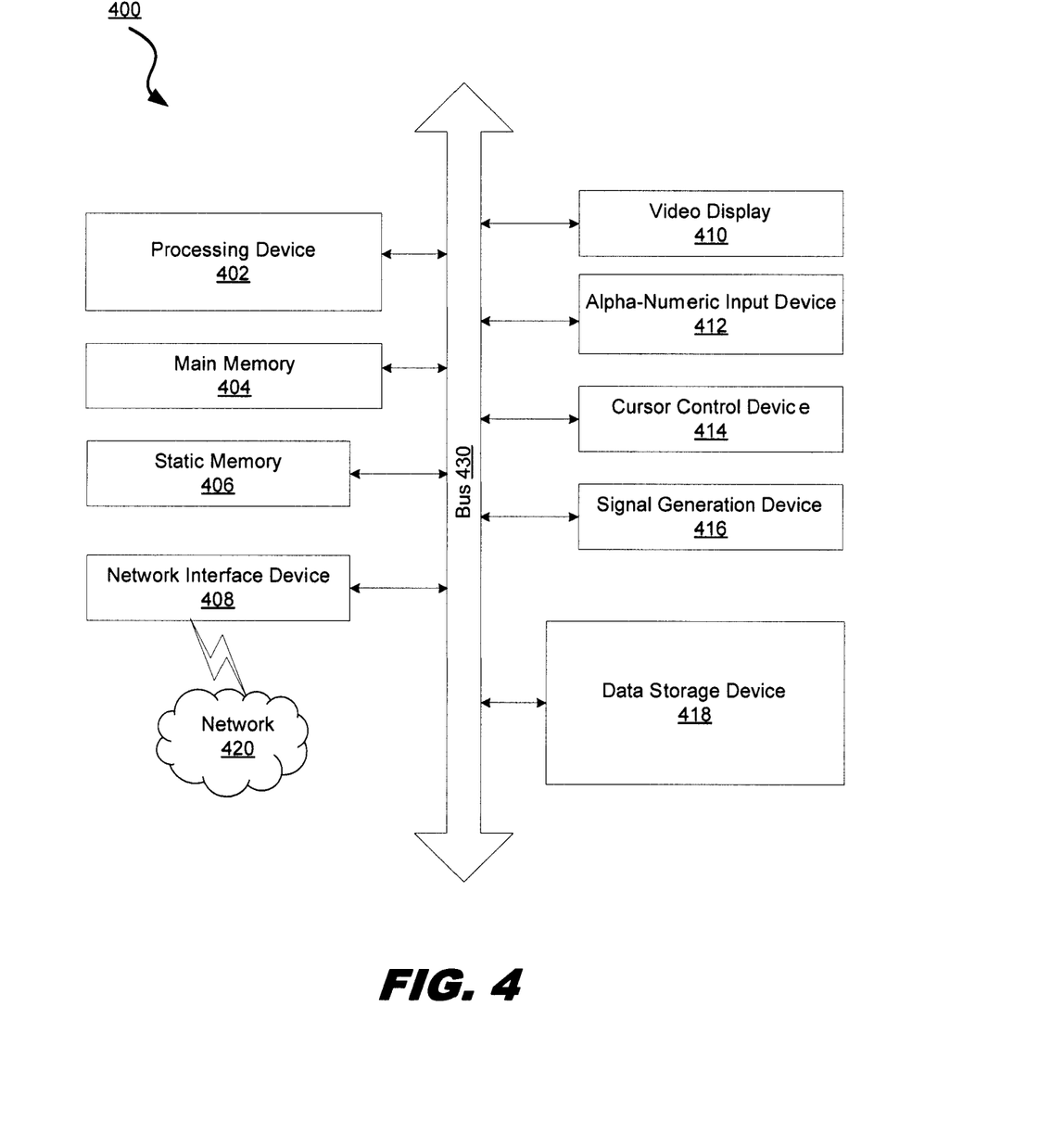
FIG. 4 is a block diagram illustrating a computer system that may perform one or more of the operations described herein, in accordance with various examples of the present disclosure.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 executes instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   detecting, by a hypervisor, a disconnect corresponding to a packet-switching application;
   sending, from the hypervisor to a quest, a notification corresponding to the disconnect of the packet-switching application;
   resetting, by the guest, a queue that stores one or more network packets corresponding to the packet-switching application, the resetting of the queue comprising discarding or re-queuing at least one of the one or more network packets;
   after receiving a guest notification, resetting a hypervisor device state corresponding to the queue;
   detecting or initiating, at the hypervisor, a reconnect of the packet-switching application;
      after the reconnect of the packet-switching application, providing the hypervisor device state to the packet-switching application to synchronize a state of the queue between the guest and the packet-switching application; and
   processing additional network packets using the queue.

2. The method of claim 1, wherein the hypervisor provides a first virtual machine and a second virtual machine, wherein the packet-switching application runs on the first virtual machine, and wherein the guest runs on the second virtual machine.

3. The method of claim 2, wherein a virtual device is provided on the second virtual machine, and wherein the queue is included in a memory space of the virtual device.

4. The method of claim 1, wherein the hypervisor device state indicates one or more memory addresses corresponding to the queue.

5. The method of claim 1, wherein the hypervisor resets the hypervisor device state by updating an index corresponding to the queue to include a pre-configured value.

6. The method of claim 1, wherein the at least one of the one or more network packets is discarded from the queue by clearing one or more memory addresses corresponding to the queue.

7. The method of claim 1, wherein the hypervisor sending the notification to the guest includes setting a flag.

8. The method of claim 1, wherein the hypervisor sending the notification to the guest includes triggering an interrupt.

9. The method of claim 1, wherein the guest notification includes an identifier corresponding to the queue.

10. A non-transitory machine-readable medium having stored thereon machine-readable instructions executable to cause a machine to perform operations comprising:
   determining that a packet-switching component has been disconnected;
   sending, from a hypervisor to a quest, a notification corresponding to the determined disconnect;
   resetting, by the guest, a queue that stores one or more requests corresponding to the packet-switching component, the resetting including discarding or re-queuing at least one of the one or more requests;
   after receiving a guest notification, resetting a hypervisor device state corresponding to the queue by updating an index to include a pre-configured value;
   detecting or initiating, at the hypervisor, a reconnect of the packet-switching component;
   after the reconnect of the packet-switching component, providing the hypervisor device state to the packet-switching component to synchronize a state of the queue between the guest and the packet-switching component; and
   processing additional requests using the queue.

11. The non-transitory machine-readable medium of claim 10, wherein the hypervisor provides a first virtual machine and a second virtual machine, wherein the packet-switching application runs on the first virtual machine, and wherein the guest runs on the second virtual machine.

12. The non-transitory machine-readable medium of claim 11, wherein a virtual device is provided on the second virtual machine, and wherein the queue is included in a memory space of the virtual device.

13. The non-transitory machine-readable medium of claim 10, wherein the packet-switching component provides packet-switching functionality for network function virtualization (NFV).

14. The non-transitory machine-readable medium of claim 10, wherein the one or more requests include network packets.

15. The non-transitory machine-readable medium of claim 10, wherein the hypervisor device state indicates one or more addresses corresponding to the queue.

16. The non-transitory machine-readable medium of claim 10, wherein the one or more requests are discarded from the queue by clearing one or more memory addresses corresponding to the queue.

17. A system comprising:
   a non-transitory memory; and
   one or more hardware processors coupled to the non-transitory memory to read instructions from the non-transitory memory and to cause the system to perform operations comprising:
      detecting, by a hypervisor, a fault corresponding to a packet-switching component;
      sending, from the hypervisor to a quest, a notification corresponding to the fault;
      resetting, by the guest of a virtual machine that is provided by the hypervisor, a queue that stores one or more one or more network packets, the resetting including discarding or re-queuing at least one of the one or more network packets;
      after receiving a guest notification, resetting a hypervisor device state corresponding to the queue;
      detecting or initiating, at the hypervisor, a recovery of the packet-switching component;
      after the recovery of the packet-switching component, providing the hypervisor device state to the packet-switching component to synchronize a state of the queue between the guest and the packet-switching component; and
      processing additional network packets using the queue.

18. The system of claim 17, wherein the guest and the packet-switching component access the queue to store and retrieve network packets.

19. The system of claim 17, wherein the queue is provided in a memory space of a virtual device of the virtual machine.

20. The system of claim 17, wherein the hypervisor resets the hypervisor device state by updating an index corresponding to the queue to include a pre-configured value.

* * * * *